US007162465B2

(12) United States Patent
Jenssen et al.

(10) Patent No.: US 7,162,465 B2
(45) Date of Patent: Jan. 9, 2007

(54) SYSTEM FOR ANALYZING OCCURRENCES OF LOGICAL CONCEPTS IN TEXT DOCUMENTS

(76) Inventors: Tor-Kristian Jenssen, Kurolinerveien 2C, Trondheim (NO) N-7021Trondheim; Eivind Hovig, Sognsveien 31, Oslo (NO) 0851 Oslo ( * ) Notice: Subject to any disclaimer, the term of this patent is extended or adjusted under 35 U.S.C. 154(b) by 160 days.

(21) Appl. No.: 10/325,713

(22) Filed: Dec. 20, 2002

(65) Prior Publication Data

US 2003/0225773 A1    Dec. 4, 2003

Related U.S. Application Data

(60) Provisional application No. 60/342,682, filed on Dec. 21, 2001.

(51) Int. Cl.
*G06F 17/30* (2006.01)
*G06F 157/00* (2006.01)
(52) U.S. Cl. .............................. 707/1; 707/3; 715/500; 715/781
(58) Field of Classification Search ................... 707/1, 707/3, 6, 9, 100, 101
See application file for complete search history.

(56) References Cited

U.S. PATENT DOCUMENTS 6,446,061 B1 * 9/2002 Doerre et al. .................. 707/3

OTHER PUBLICATIONS

Jenssen et al., "Pubgen: Discovering and visualizing gene-gene relations" presented at the Fourth Annual International Conference on Computational Molecular Biology, Tokyo, Japan, (Apr. 2000).
Jenssen et al., "A literature network of human genes for high-throughput analysis of gene expression" *Nature Genetics*, vol. 28, pp. 21-28 (May 2001).
Stapley et al., "Biobibliometrics: Information Retrieval and Visualization From Co-Occurrences of Gene Names in Medline Abstracts" *Pac. Symp. Biocomput.* 5, pp. 524-540, (2000).

* cited by examiner

*Primary Examiner*—Jeffrey Saffin
*Assistant Examiner*—Hassan Mahmoudi
(74) *Attorney, Agent, or Firm*—Bacon & Thomas PLLC

(57) ABSTRACT

A method for indexing, extracting, analyzing, and utilizing co-occurrences of logical concepts in text documents is disclosed. References to logical concepts are detected by a text processing procedure by detection of descriptors, e.g., names, also including abbreviations, from a hierarchical dictionary with names and synonyms for said logical concepts, or database identifiers. Co-occurring concepts are indexed and stored in a database as a list or a table. Analysis of co-occurrences detects expressed and implied relationships between co-occurring concepts based on statistical and lexical text analysis. The method includes a procedure to create domain-specific hierarchical dictionaries for logical concepts in a given domain.

21 Claims, 7 Drawing Sheets

SYSTEM FOR ANALYZING OCCURRENCES OF LOGICAL CONCEPTS IN TEXT DOCUMENTS

RELATED APPLICATION

This non-provisional application is related to and claims priority from provisional application No. 60/342,682, entitled "A Method and System for Analysing Occurrences of Logical Concepts in Text Documents", filed on Dec. 21, 2001, which is hereby fully incorporated by reference.

FIELD OF THE INVENTION

The present invention concerns a system for information extraction in complex knowledge domains. The invention also relates to methods and facilities for analysing and utilising the information that is extracted.

BACKGROUND OF THE INVENTION

In a number of complex scientific and economic fields, or knowledge domains, the majority of the existing knowledge and information about common concepts in these knowledge domains is recorded only in free-text form and does not exist in any structured form, such as structured fields in structured databases. This limits the possibility of utilizing this knowledge in the computerized analysis of data from such domains. Moreover, due to the complexity and amount of knowledge, navigation in the knowledge spaces of such domains is cumbersome and would be much easier if some of this information could be extracted and structured around pertinent concepts in such domains.

Conventional methods for data analysis, including but not limited to statistical methods and machine-learning methods, have few or no means for incorporating general background knowledge not explicitly encoded in a target data set to be analysed. With this background and in light of the aforementioned fact that much existing knowledge relevant to the interpretation of the results of conventional data analysis is only recorded in free-text, there is a need for methods for automating the extraction of such knowledge in a form amenable for further incorporation into data analysis and methods for carrying out integrated data analysis incorporating such extracted background knowledge into the analysis of a target data set are highly desired.

Information retrieval in many knowledge domains tends to be complicated by concepts having several names, either one primary name and aliases or several equivalent synonyms. Synonymy hampers information retrieval, as the user is required to know all alternative names of a concept in order to be able to specify for a system to retrieve all relevant information existing. Polysemy, i.e., the phenomenon that several concepts have the same name, further complicates information retrieval. In this case information retrieval systems tend to produce documents not only relevant to the target concept, but also documents irrelevant to the target but relevant for other concepts with the same name.

Functional genomics is at an early stage, but with some genomes sequenced and others near completion, much attention will shift towards determining the biological function of genes and other functional parts of the genome sequences. High throughput technologies for measuring gene expression and protein levels in living cells and tissue types will be critical tools in this research. Unsupervised methods for data analysis, such as hierarchical clustering, make no use of existing knowledge leaving this to the user in the interpretation following analysis. As thousands of genes/proteins can be measured in a single experiment a computerized procedure utilizing the vast amounts of existing knowledge is highly desired.

A prerequisite for such procedures is the availability of background knowledge in a computer-readable format. Existing structured databases in the field cover but a small fraction of all current knowledge and the majority of this knowledge is recorded only in free-text format, that is not readily available for incorporation in computerized data analysis. Related approaches for information extraction in this field have focused on specific relationships between molecular entities, such as protein-protein interactions, protein-gene interactions, protein-drug interactions, cellular location of proteins, and molecular binding relationships. Detection of occurrences of entities has been done using recognition of nouns or noun phrases and by the use of predefined keyword lists. Keyword indexing has been used to annotate proteins. Reference is made to Stapley, B. J. & Benoit, G., Biobibliometrics: Information retrieval and visualization from co-occurrence of gene names in Medline abstracts. *Pac Symp Biocomput* 5, 524–540 (2000). This discloses a gene network based on term occurrence, concerning genes of the yeast organism extracted from 2,524 MEDLINE documents chosen on the basis of being from the years 1997 or 1998 and also containing the MeSH term '*Saccharomyces cerevisiae*'. Their approach also describes the construction of a gene network based on gene terms.

At RECOMB2000 in Tokyo, Japan, Apr. 8–11 2000, a printed pamphlet was presented by Tor-Kristian Jenssen, Astrid Lagreid, Jan Komorowski and Eivind Hovig, entitled "Pubgen: Discovering and visualizing gene-gene relations". This describes the creation of a network of gene relationships. To identify genes as correctly identified in an article, gene symbols, and to some extent gene names, were used. It was recognised that a few particular genes and symbols would require special consideration.

SUMMARY OF THE INVENTION

It is an object of the invention to provide a method of text analysis for the purpose of improving information retrieval for concepts in complex scientific and economic domains, particularly domains having some degree of synonymy and polysemy complicating traditional information retrieval based on keyword indexing.

It is a further object of the invention to provide a method of text analysis for the purpose of extracting and analysing information about relationships between concepts expressed or implied in text documents.

It is a still further object of the invention to provide automated methods for utilizing information about relationships between concepts in data processing and analysis.

These and other objects, features and advantages are accomplished by the disclosed invention. Broadly, the invention comprises a method implemented on a computer system for efficient concept-level indexing and extraction and retrieval of expressed and implied relationships between concepts. The indexing part includes providing a method for building a hierarchical dictionary for concepts in the domain of interest. The hierarchical dictionary is constructed by inputting concept names and synonyms that are organized and stored as a list of concepts. The indexing proceeds by first indexing names from the dictionary before organizing occurrences in text of names into occurrences of concepts. The indexing method comprise facilities for resolving synonymy and polysemy, wherein the former is resolved by the use of a domain specific dictionary and the latter is resolved by analysis of the context wherein a concept descriptor is found.

The concept level indexes may be used in order to facilitate efficient concept level information retrieval.

The extraction part searches for occurrences of concepts and matches concepts that co-occur within a single document, or other unit of text used. These concept co-occurrences are subjected to a statistical analysis including the calculation of frequencies of co-occurrences reflecting the strength of association in the relationship within a given pair of concepts. Further domain-specific concepts may be indexed and occurrences of such ancillary concepts may serve as additional annotation of the co-occurrences of the target concepts.

Utilization of extracted co-occurrences is provided by methods to superimpose and otherwise combine relationships between concepts onto external data in data analysis of such external data.

Viewed from one aspect the present invention provides a method of constructing a network of conceptual entities and relationships between these. In this method, data processing means are used to scan at least one database of text documents referring to these concepts so as to identify concepts by scanning for concept abbreviations, to note co-occurrences of concepts in the same article, to record information representing the co-occurrences and the number of documents in which they appear, and to provide a network representing relationships between concepts, wherein concepts are also identified in documents by means of scanning for concept names and in that at least some abbreviations are only accepted as representing a reference to a concept in a document if the scan reveals that at least one word from one name of the concept also appears in a suitable part of the document.

In accordance with one aspect of the invention, there is provided a method to construct a concept-level dictionary for a given domain. The method comprises the steps of inputting lists of names and abbreviations from one or more textual data-sources. One or more of these sources may be designated as the primary reference, whereupon conflicting information from other sources will be overridden. Otherwise, conflicting information is resolved by voting, i.e., for instance, if a name has been associated with several concepts in the different sources, the concept with the most votes will be chosen to have the name associated, and similarly for abbreviations.

In accordance with another aspect of the invention, there is provided a method to evaluate the quality of name-sources comprising the steps of recording the frequency with which information from a name-source is overridden by the primary reference or the majority vote.

Preferably a filtering procedure is carried out when mapping occurrences of abbreviations into valid occurrences of concepts, in which if an abbreviation is longer than L1 characters and is found in less than K documents, then all occurrences of the abbreviation are treated as valid. Typically, L1 may be 4 and K may be 10. If an abbreviation fails these criteria, then each document is checked to determine whether it contains any words from any of the long names of the concept. Preferably, if the abbreviation is more than L2 characters an occurrence of the abbreviation will be treated as valid if there are at least W words from at least one of the long names. If the symbol is no more than L2 characters long, then there must be strictly more than W words from at least one of the long names. Typically, L2 is 2 and W is 1. Moreover, typically L2 is less than or equal to L1.

The strategy of accepting occurrences of concept abbreviations, such as gene symbols, in some cases only when a word, or two or more words, from an associated concept name, such as a gene name, occurs with the abbreviation goes some way to resolve ambiguities caused by polysemy. The remaining ambiguities cause a limitation on the achievable precision in the indexing method. Precision may be increased by changing the parameters L1, K, L2, and W but with the effect of reducing the achievable recall. It is preferable to prioritise recall, as it is easier for the user to relate to noise that is present than to ponder relationships that are missing.

In a preferred embodiment of the invention, family variant names are identified by scanning documents for a family stem word and then looking for a variant designation immediately before or immediately after the family stem word.

In accordance with another aspect of the invention, there is provided a method of compiling a database of associations between concepts and text documents referring to the concepts using data processing means, comprising the steps of establishing one or more lists linking concepts with names and abbreviations, and automatically scanning text documents by searching for names and abbreviations which are recorded in a list, wherein at least some abbreviations are only accepted as representing a reference to a concept in an article if the scan reveals that at least one name of the concept also appears in the document.

In accordance with another aspect of the invention, there is provided a method of compiling a database representing co-occurrences of concepts in text documents using data processing means, comprising the steps of establishing one or more lists linking concepts with names and abbreviations, and automatically scanning text documents to identify concepts by searching for concept names and abbreviations which are recorded in a list, wherein at least some concept abbreviations are only accepted as representing a reference to a concept in a document if the scan reveals that at least one word from at least one name of the concept also appears in the document.

In accordance with another aspect of the invention, there is provided a method of compiling a database of concepts referred to in text documents using data processing means, comprising the steps of establishing a list linking concepts with concept names, the list including concept family name stem words, and automatically scanning text documents to identify family variant names by searching for family stem words recorded in the list and, where a family stem word is identified in the document, searching for variant designations before or after the family stem word in the document.

Other aspects of the invention relate to data processing means programmed to carry out the methods described above; to data processing means or media for data processing carrying a database of associations between concepts or between concepts and documents produced in accordance with the methods described above; and to computer software, provided on physical media or supplied as signals from a remote location, for programming data processing means to carry out the methods described above

BRIEF DESCRIPTIONS OF THE DRAWINGS

DETAILED DESCRIPTION OF THE INVENTION

Figure 1:
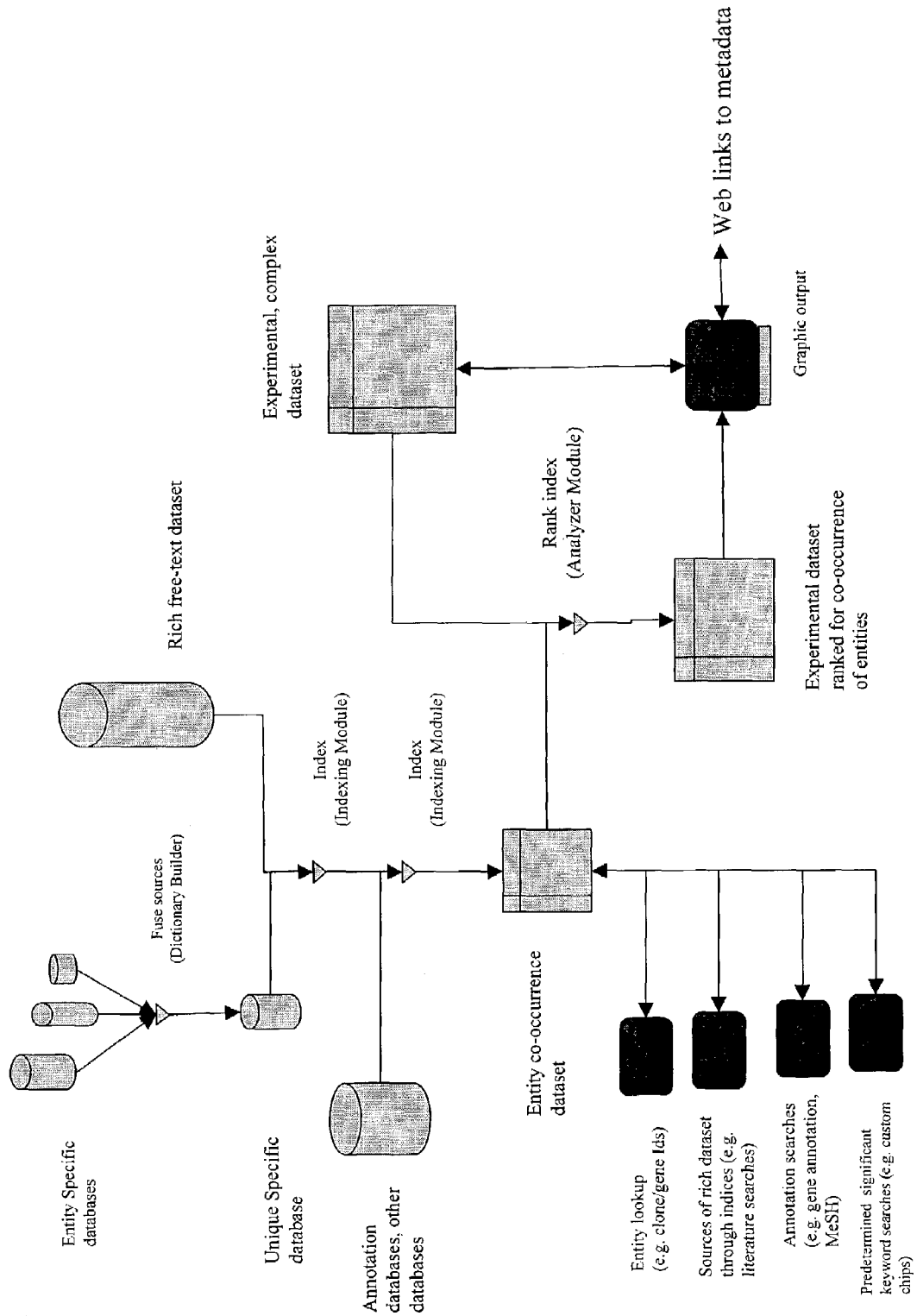
FIG. 1 is a diagram of information and data flow in a processing system embodying the present invention.
Figure 2:
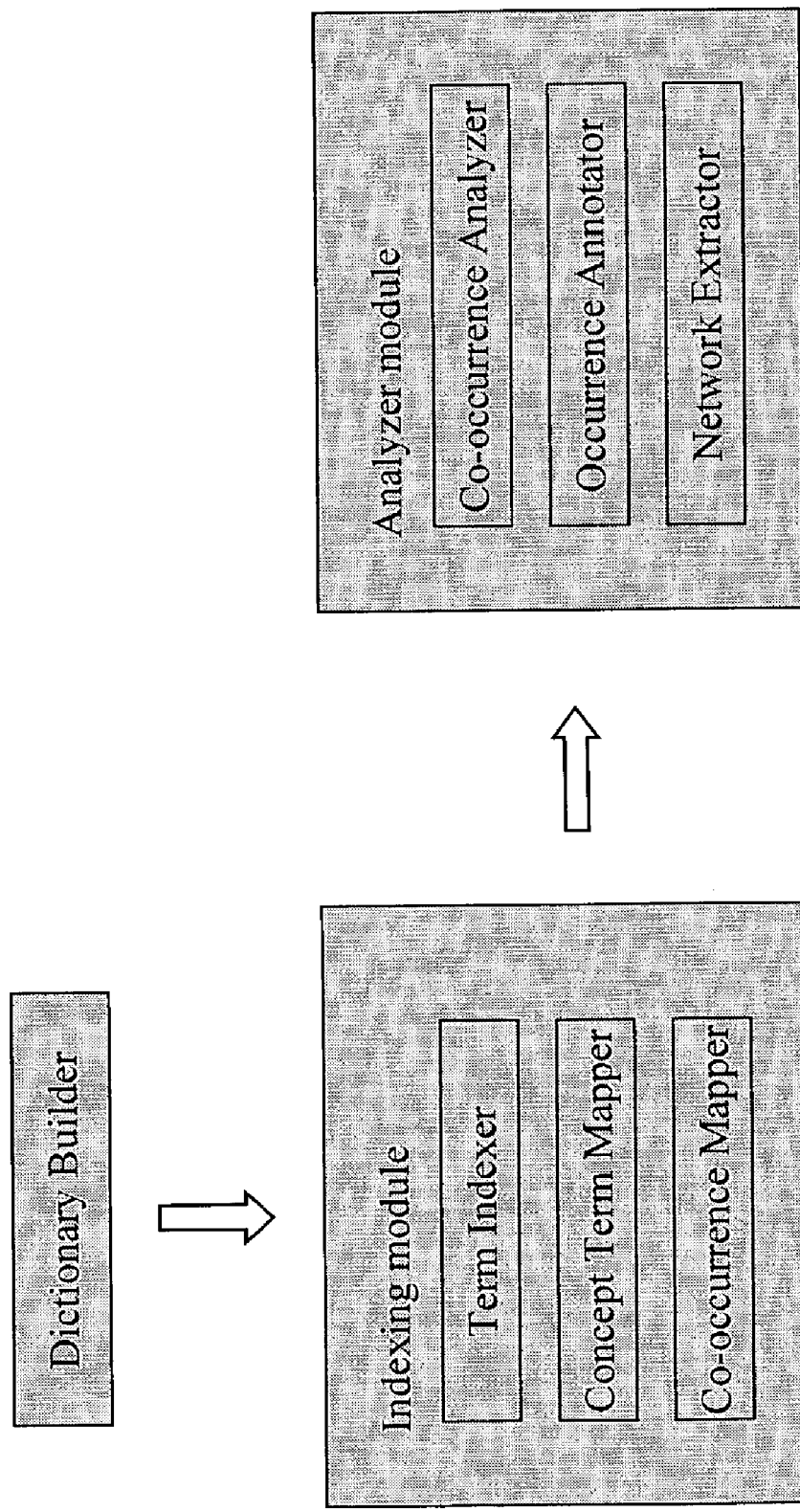
FIG. 2 is a block diagram of an information processing system embodying present invention.

FIG. 1 depicts how entity specific source databases are fused into a single unique concept database using a Dictionary Builder module, see FIG. 2. Following this, target concepts and ancillary concepts are indexed in the text document data, using the unique specific database, a rich free-text dataset, annotation databases and other databases, by means of an Indexing Module, again see FIG. 2. After indexing, and the creation of an entity co-occurrence dataset, concept occurrences are analysed and ranked using an Analyzer Module, also see FIG. 2. An experimental, complex dataset, using the analyser module, creates an experimental dataset ranked for-co-occurrences of entities. This can be used to create graphic output, and this can be linked by web links to metadata.

Linked to the entity co-occurrence dataset are: entity lookup (e.g. clone/gene ID's); sources of rich dataset through indices (e.g. literature searches); annotation searches (e.g. gene annotation, MeSH); and predetermined significant keyword searches (e.g. custom chips).

With reference to FIG. 2, the system comprises three main modules: Dictionary Builder, Indexing Module, and Analyzer Module. The Dictionary Builder provides the functionality to organize names and abbreviations from a domain into a hierarchical dictionary with a unique record for each concept. The Indexing Module provides the functionality to index concept names and abbreviations (Term Indexer), mapping occurrences of concept names into occurrences of concepts (Concept Term Mapper), and indexing co-occurrences (Co-occurrence Mapper). The analyzer module provides functionality for analyzing concept occurrences, and utilizing concept co-occurrence networks in downstream data analysis of external data related to the concepts. This includes the Co-occurrence Analyzer used to perform statistical analyses of co-occurrences and other validation of the extracted occurrences, the Occurrence Annotator used to provide context to co-occurrences of target concepts by the use of occurrences of ancillary concepts, and the Network Extractor used to extract interesting subsets of concepts with their derived literature co-occurrence networks based on analysis of external data in conjunction with co-occurrence data, and/or based on keyword search.

Figure 3:
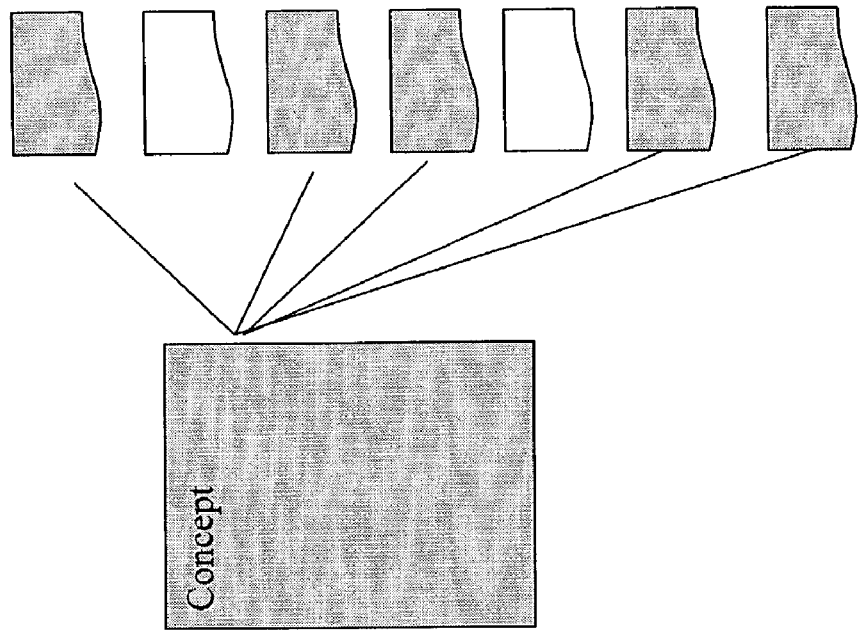
FIG. 3 is a diagram illustrating the method of filtering and mapping occurrences of names into occurrences of concepts.
Figure 3:
Figure 3:
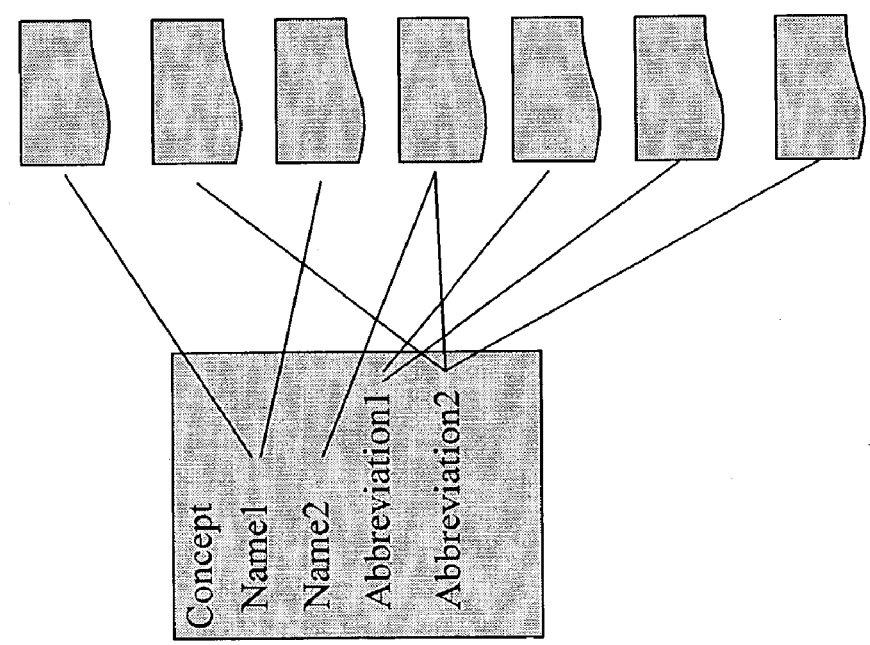

The diagram of FIG. 3 shows one concept with two names and two abbreviations and seven documents wherein at least one of the concept's names or abbreviations have been found. The left hand part of the diagram shows the links between names and abbreviations and documents before filtering and mapping to the concept level. The right hand part of the diagram shows the links between the concept and documents after filtering and mapping. Two of the documents on the right hand side are coloured with a different colour reflecting that the occurrences of the corresponding names/abbreviations in these documents are not accepted as valid occurrences of the concept after filtering. Also, multiple links to a single document from several names or abbreviations belonging to one concept are replaced by a single link from this concept to the corresponding document.

In the following description, details of an embodiment of the invention illustrated by way of example using human genes as concepts and MEDLINE citation records free-text fields, i.e., titles and abstracts combined, as documents are described. The use of MEDLINE records restricts the relationships that can be found to those mentioned in titles and abstracts. Nevertheless, the use of MEDLINE records has the advantage of making an explicit basis for defining co-occurrence. One question in this respect is whether correctly determined co-occurrences in the title and abstract precisely reflect meaningful relationships between genes. Our investigations support the premise that co-occurrence reflects meaningful biology, but also demonstrate problems generated by ambiguous gene names and symbols. The use of a thesaurus or nomenclature database for information retrieval has been debated. An advantage is that it may increase recall, i.e. the percentage of all correct occurrences that are detected, as it is not necessary to explicitly mention all alternative names. Conversely, ambiguities arise when gene terms are associated with several genes in the nomenclature database and when a gene term has been used in other contexts. This may degrade the precision, i.e. the percentage of detected occurrences that are correct. It is a main feature of the embodiment to include methods and tools to resolve such ambiguities.

By use of this embodiment of the invention, there is collected publicly available nomenclature information for human genes from the gene nomenclature database of the HUGO Nomenclature Committee, the LocusLink database, the Genome Database, and the GENATLAS database. These source databases are input to the invention, which produces a compilation of these sources resulting in a hierarchical dictionary of gene names and gene name abbreviations (hereafter referred to as gene symbols, or simply symbols). The dictionary is organized with genes on the concept level and lists of gene names and gene symbols associated with each gene. Each gene is assigned a primary gene name and an accompanying primary gene symbol. Imposing unique gene symbols allows the symbols to serve as unique identifiers of each gene concept record. A summary of the gene nomenclature database (dictionary) is given in Table 1. An example of a gene data record in the compiled nomenclature database is given in Table 2.

TABLE 1

Summary of statistics for compilation of gene nomenclature dictionary

| Source database | Genes | Withdrawn |
|---|---|---|
| HUGO | 9,722 | |
| LocusLink | 2,729 | 63 |
| GENATLA | 1,239 | 63 |
| Genome Database | 358 | 352 |
| Sum total | 13,712 | |

TABLE 2

Example database record in the compiled gene nomenclature dictionary.

| Field | Value |
|---|---|
| ID | S100A4 |
| Status | HUGO:::primary |
| | LL::::reviewed |
| | GA:::confirmed |
| | GDB:::Active |

TABLE 2-continued

Example database record in the compiled gene nomenclature dictionary.

| Field | Value |
| --- | --- |
| Primary name | HUGO/LL/GDB:::S100 calcium-binding protein A4 (calcium protein, calvasculin, metastasin, murine placental homolog) |
| Alternative names | GDB:::malignant transformation suppression 1 |
| Alternative IDs | HUGO/LL/GDB:::P9KA |
| | HUGO/LL/GDB:::PEL98 |
| | LL/GDB:::42A |
| | LL/GDB:::18A2 |
| | LL/GA/GDB:::CAPL |
| | LL/GDB:::MTS1 |
| | GA:::ST1 |
| UniGene cluster | LL:::Hs.81256 |
| Cytoband | HUGO:::1q12–q22 |
| | LL/GA/GDB:::1q21 |
| | GDB:::1pter-1p22.1 |

By further use of the invention, gene symbols and gene names can be organised into families, where each family is identified by a symbol stem or name stem and each member of the family was identified by a variant designation. For instance, the S100* family contains, among others, the members S100A1, S100A2, S100A3, S100A4, and S100B1.

In an example of using the invention, there have been indexed 13,712 human genes in over 10 million documents consisting of titles and abstracts from records from the MEDLINE citation database. In this process, for each gene, each document was scanned for the occurrence of at least one of the following, any of the gene's symbols, any of the gene's names consisting of a single word, or any of the gene's names containing a single word gene family name having the variant designation immediately before or after the occurrence of the family name stem. In this use of the invention, the text document database was processed in batches corresponding to all documents from a given year. The abbreviation filtering parameters were set to $L1=4$, $K=10$ (per year), $L2=2$, and $W=1$. Thus, following identification of an occurrence of a gene symbol a filtering step was carried out, wherein for symbols longer than 4 characters having less than 10 occurrences all occurrences were accepted as valid, for symbols longer than 2 characters all occurrences of the symbol where also 1 word from at least one of the corresponding gene's names was found together with the symbol occurrence were accepted as valid, and for symbols with 2 or fewer characters only occurrences were at least 2 or more of the words from at least one of the corresponding gene's name was found with the occurrence were treated as valid. Occurrences of gene names were accepted as valid occurrences of the gene without further processing. The results of this step were a list of genes with, for each gene a corresponding list of documents were the gene had a valid occurrence, and conversely, a list of documents with, for each document a corresponding list of genes having valid occurrences in that document. The strategy of accepting symbol occurrences as gene occurrences in some cases only when a word from an associated gene name occurs with the symbol goes some way to resolving ambiguities. Improving the precision and recall of the indexing procedure requires continual effort, but as perfect precision and perfect recall are difficult to achieve, the preferred embodiments prioritise recall, as it is easier for the user to relate to noise that is present than to ponder relationships that are missing.

One or more gene symbols were found in 1,964,717 (19.4%) of the article records. Counting each symbol found in one or more places in a record as one occurrence resulted in 3,534,061 gene-symbol occurrences. Many symbols have been used to refer to more than one gene and of the 24,443 symbols in this particular database, 2,796 were ambiguous in the sense of having associations to multiple genes, e.g., 'ALR', 'MTS1', and 'PBP'. Each symbol occurrence was treated as a possible occurrence of any of the genes where the symbol had been listed as a primary symbol or an alternative symbol. This gave 8,920,666 putative gene occurrences. Some gene symbols coincided with common abbreviations in other contexts, e.g., 'II', 'IV', and 'ABO'. After mapping occurrences of gene symbols to genes in accordance with the ambiguity resolution method of the invention, only 885,146 gene occurrences based on symbols remained.

Figure 4:
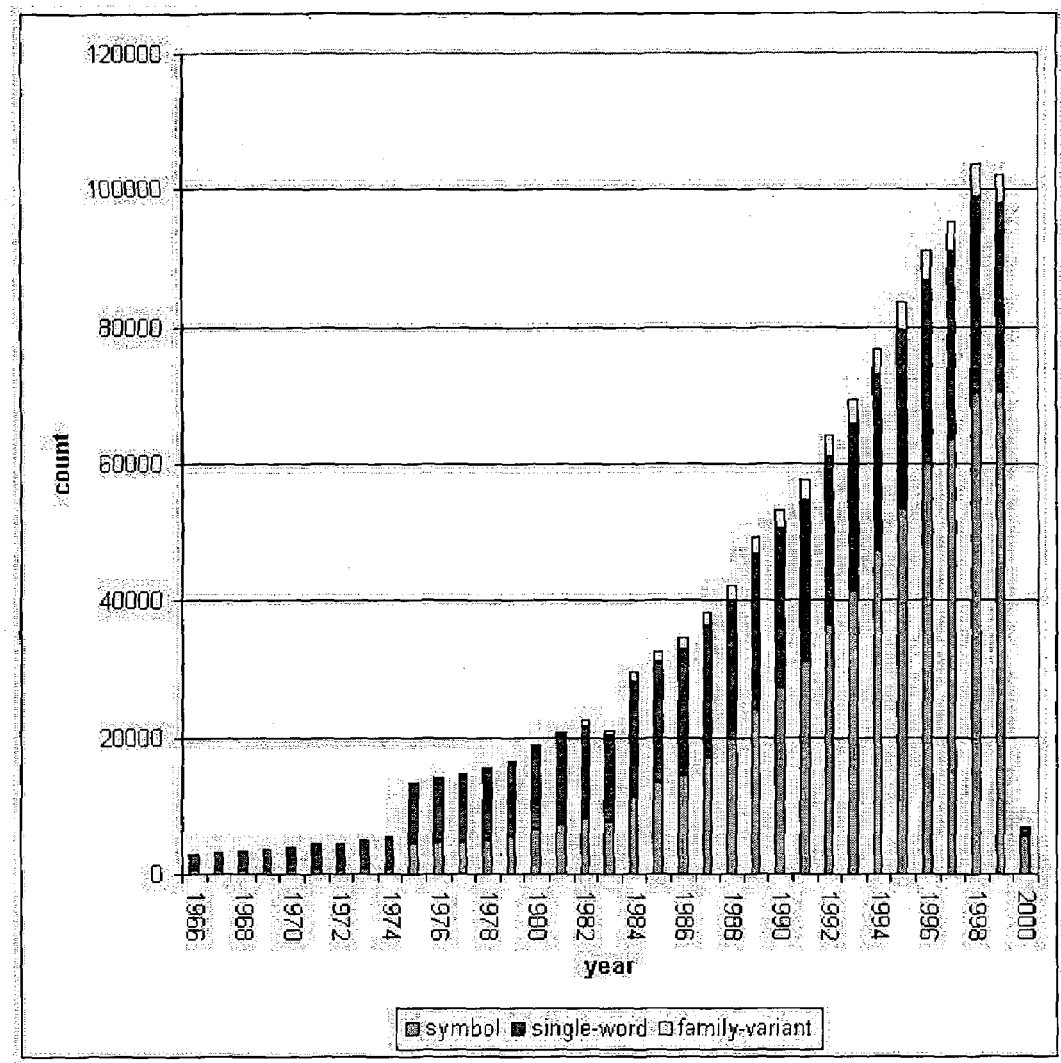
FIG. 4 is a chart showing the number of genes found by indexing the MEDLINE citation record database by year.

FIG. 4 is a chart showing contributions to the gene to article index over time from gene symbols, single-word gene names, and family-variant gene names. The MEDLINE records before 1975 do not contain abstracts. More article records for the years 1999 and 2000 were expected to be included into MEDLINE after the time of indexing.

Figure 5A:
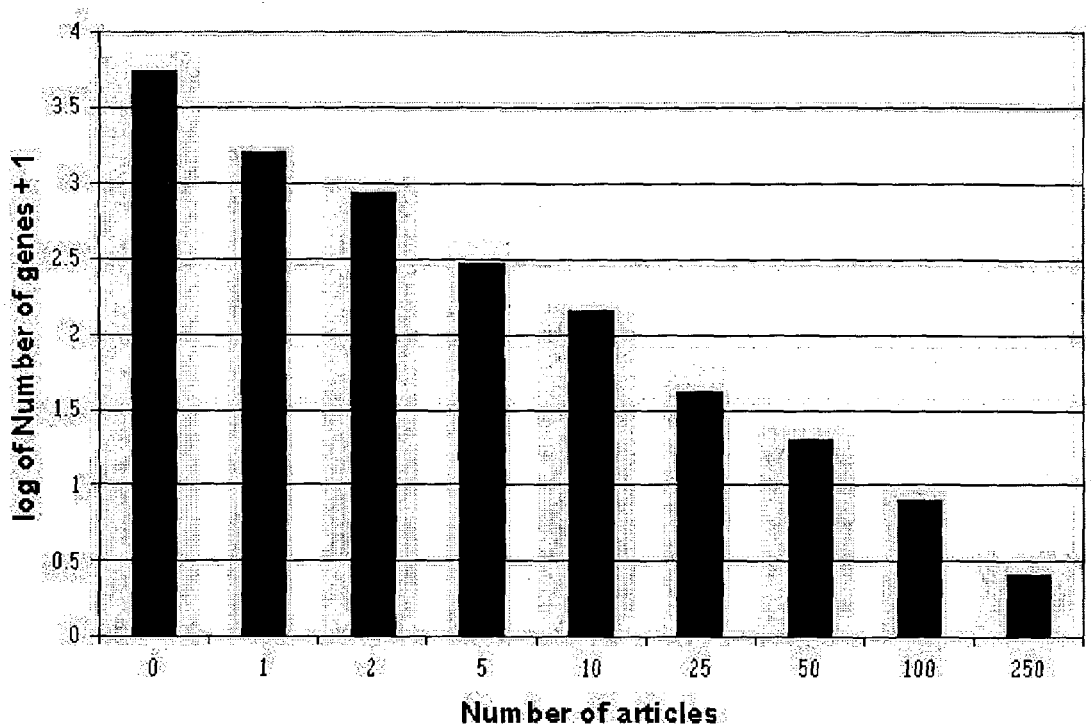
FIGS. 5a and 5b are charts showing the number of genes having various numbers of references and gene neighbours, according to co-occurrence.

FIG. 5a is a chart showing the distributions of genes with respect to the number of articles per gene symbol. The height of each column is proportional to the base-10 logarithm of the number of genes +1 for the given number of articles or the given number of gene neighbours.

By a similar use of the invention, it is possible to index gene ontology terms. In this use of the invention the gene ontology terms can be viewed as ancillary concepts and indexed with the purpose of annotating, or creating a context, for co-occurrences of the target concepts, i.e., the genes. On the concept level, gene ontology terms are identified by a gene ontology (GO) id, and to each id a name and zero or more synonyms are associated. The GO terms can be indexed by scanning the documents for occurrences of names or synonyms and mapping such occurrences to the corresponding concepts, i.e., GO ids. The result of this step is a list of terms with, for each gene a corresponding list of documents were the gene had a valid occurrence, and conversely, a list of documents with, for each document a corresponding list of terms having valid occurrences in that document.

By further use of the invention, the list of genes with associated documents can be processed to create a network of co-occurring genes. The network is constructed by associating to each gene all articles wherein the gene was found, and thereafter, for each gene using the list of associated articles to further associate the gene with all other genes also found in one or more of these associated articles. Each pair of genes found in one or more article is given a co-occurrence weight equal to the number of articles wherein the pair was co-occurring. In the example, the network contained 139,756 pairs of such related genes with a total occurrence weight of 1,087,757. Among the 13,712 genes, 7,512 had one or more neighbours, and 710 genes had literature references but no neighbours. Of the 5,490 genes that were not found in any articles, 5,202 genes had a status as 'reserved' or 'provisional'.

Figure 5B:
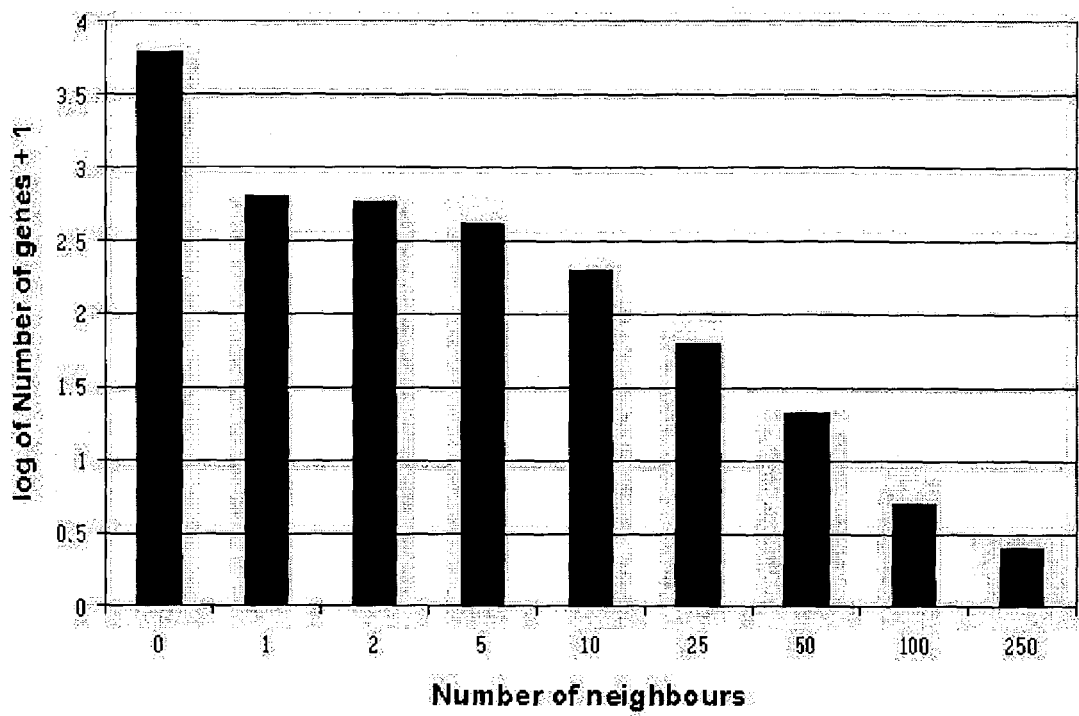

FIG. 5b is a chart showing the distributions of genes with respect to the number of gene neighbours. The height of each column is proportional to the base-10 logarithm of the number of genes +1 for the given number of articles or the given number of gene neighbours.

Figure 6:
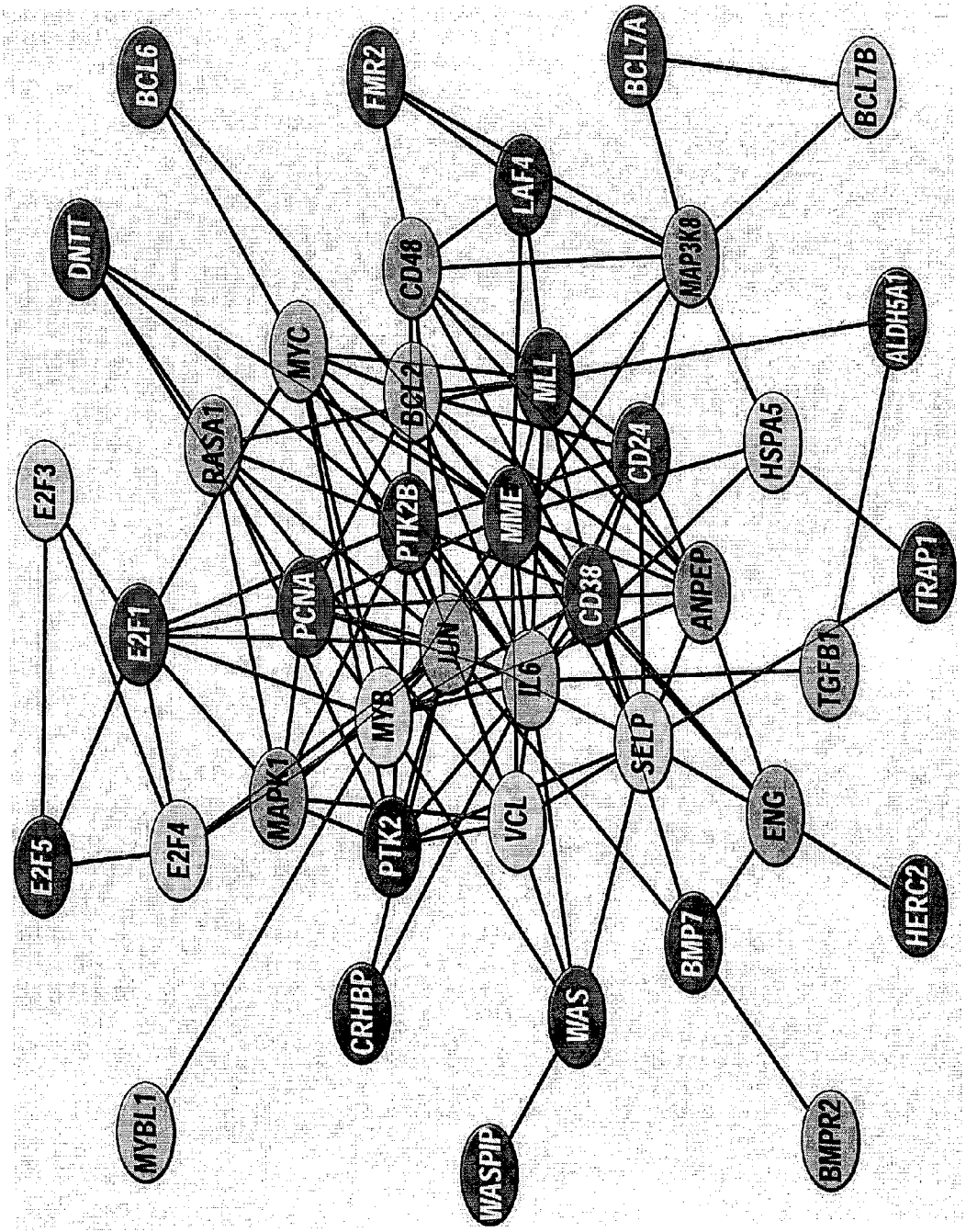
FIG. 6 is an illustration of a network of human genes connected by co-occurrence in the literature.

FIG. 6 shows a literature network produced in accordance with the present invention of the genes in the germinal centre B-cell signature. In practice, colours will be used to represent relative expression values when comparing tonsil germinal centre B cells versus activated blood B cells. For example, yellow reflects equal amounts of expression in the two samples, red reflects genes that are more expressed in tonsil germinal centre B cells than in activated blood B cells, and green reflects genes that are less expressed in tonsil germinal centre B cells than in activated blood B cells. Lines connect genes that have co-occurred in one or more articles. Annotations reflecting the number of literature co-citations have been omitted for readability.

Further analysis of the literature gene network can be carried out by associating with each co-occurrence of each pair a link to the article wherein the co-occurrence was found and further associating to this article, and thus also to the specific co-occurrence of the gene pair, a list of keywords relevant to the biomedical domain and in addition, through, the list of gene ontology concepts with associated documents, a list of gene ontology concepts to the occurrence, and a list of MeSH terms.

As an evaluation of the correctness of the gene network defined by the co-occurrences, in an example there has been carried out a manual examination of a subset of 1000 randomly chosen pairs, from over 111 thousand pairs found. The experiment consisted of drawing 500 gene pairs with a weight of 1, i.e. pairs of gene found in exactly one article record, and 500 pairs with a weight of 5 or more. Table 3 shows how the 1,000 gene pairs could be classified into seven categories. According to these efforts, the precision of the extracted co-occurrences was between 60 and 70 percent.

TABLE 3

Types of biological relationships between genes among 1000 randomly chosen pairs of genes from the literature gene network.

| | Count | |
|---|---|---|
| Relationship | W1 | W5+ |
| Cell biology | 43 | 24 |
| Expression correlation | 151 | 183 |
| Histology | 22 | 66 |
| Homology | 29 | 75 |
| Chromosome mapping | 53 | 6 |
| Other | 4 | 5 |
| Incorrect | 198 | 141 |

Six types of relationships covered pairs with meaningful biological relationships and one category labelled incorrect for pairs where no relationship was found or it was obvious that the association was incorrect. The proportions of incorrect pairs were 40% and 29% percent for the low weight and high weight categories, respectively. The distributions of errors are shown in Table 4. There were essentially three types of errors in the higher weight group, i.e., symbol confusion with other genes, very general symbols, and confusion resulting from short names. In the low weight group, errors due to general symbols were predominating, while the other errors were more evenly distributed. This reflected the expected result that there were fewer sources of systematic errors, while infrequent errors had more varied causes.

Further analysis of these results showed that name polysemy was the main contributing factor to noise, but also that the filtering step significantly improved the signal to noise ratio. Pairs from the W1 and W5+ categories where no biological relationship was found or the link was obviously incorrect where further analyzed, also by manual inspection; summary in Table 4.

TABLE 4

Categories of incorrectly linked pairs of genes found among 1000 randomly chosen pairs in the literature gene network.

| | Count | |
|---|---|---|
| Category | W1 | W5+ |
| Symbol, other gene | 19 | 40 |
| Symbol, gene other species | 8 | 3 |
| Symbol, cell line | 20 | 4 |
| Symbol, other biomedical concept | 15 | 1 |
| Symbol, general | 82 | 43 |
| Symbol, other | 20 | 4 |
| Short name | 34 | 46 |
| Total number of incorrect links | 198 | 141 |

"Symbol, other gene" denotes incorrect links due to a symbol associated with several genes. "Symbol, gene other species" denotes incorrect links due to a symbol that had been used in another species. "Symbol, cell line" denotes symbols that had also been used as names for cell lines, and "Symbol, other biomedical concept" covers other biomedical concepts, e.g., diseases or drugs. The category "Symbol, general" includes symbols that had been used in a number of contexts, e.g., P1 had been used to refer to postnatal day 1. "Symbol, other" includes other incorrect links caused by symbol confusion not in any of the above categories. "Short name" denotes incorrect links caused by short gene names that have other uses, e.g., medullablastoma had in most of the manually checked abstracts we been used to refer to the tumour type and not the gene In a further example of use of the invention, there have been created two external databases of implied relationships between genes in the gene nomenclature database constructed in accordance with the invention. The Database of Interacting Proteins (DIP; http://dip.doe-mbi.ucla.edu/) contains a list of interacting proteins in human. By use of the invention, the list of interacting protein pairs was translated into a corresponding list of derived relationships between the corresponding genes. The DIP-derived links were found by selecting pairs of interacting proteins where both proteins were human (determined by the SWISS-PROT ID (http://www.expasy.ch/sprot/sprot-top.html)). Participating proteins were linked to human genes through information in SWISSPROT, OMIM, and the nomenclature compilation of the embodiment of the invention. Since DIP includes self-interactions, we included 'pairs' with the same gene, when comparing against the DIP database. These pairs of genes were then input to the invention to assess precision and recall of the co-occurrence network. The DIP database contained 169 human pairs of interacting proteins recorded from articles published in peer-reviewed journals within the time span covered by the network. The 171 proteins included in the 169 protein pairs were mapped to corresponding genes in the network giving 169 pairs of human genes. Table 5 shows the number of pairs from DIP found by the network. It contained 51% of the DIP pairs, a more than 6-fold improvement over random experiments (assuming sampling without replacement of an equal number of pairs as found in the network from all possible pairs over the 171 genes).

To examine performance in comparison with a very rich independent information source, there has been selected from the Online Mendelian Inheritance in Man (OMIM) database (http://www.ncbi.nlm.nih.gov/entrez/query.fcgi?db=OMIM) all genes that have been mapped to a chromosomal location and for each of these we analysed the textual description in OMIM to locate OMIM numbers for other mapped genes. This resulted in 19,157 ordered pairs of genes. As shown in Table 4, the present system correctly incorporated 45% of the OMIM pairs, an 88-fold increase over random sampling. OMIM record information content varies significantly depending on editors. In a number of the records, the information is biased towards gene mapping and diseases, and will therefore include gene associations that are not recorded in the present system, while in others very little information is offered. The Online Mendelian Inheritance in Man (OMIM) database contains information about human genes linked to inheritable diseases. For a number of the known human genes, this database contains a brief description, including, in some cases, cross-references to other human genes. By use of the invention, these cross-references were extracted to create a list of derived relationships between the genes mentioned in the OMIM database. These pairs of derived relationships were then input into the invention to assess precision and recall f the co-occurrence network. These analyses indicate that the co-occurrence relationships define a useful definition for an abstracted notion of relatedness between the genes; summary provided in Table 5.

Links in OMIM were found by analysing the text part of the OMIM record for each mapped gene in OMIM. Assuming a process of sampling without replacement, we calculated the number of actual links from DIP and OMIM expected to be found in a random sample with the same number of pairs as the number of links in the network in accordance with the invention.

TABLE 5

Signal to noise ratio assessed by comparison to manually cured databases

| | Database | |
|---|---|---|
| | DIP | OMIM |
| Number of genes | 171 | 6,404 |
| Number of actual links | 169 | 19,157 |
| Number of possible links | 14,535 | 37,350,432 |
| Number of actual links found | 86 | 8,585 |
| Number of all links found | 1,052 | 187,226 |
| Number of expected actual links | <13 | <97 |
| p-value | <E−10* | <E−7† |
| Improvement over random | >6 | >88 |

*$p(x \geq 86) = 1 - p(x < 86) < 1 - p(x \leq 39) < 1.1\text{E}-11$
†$p(x \geq 8585) = 1 - p(x < 8585) < 1 - p(x \leq 160) < 7.4\text{E}-8$ The DIP derived gene pairs not detected by the network were further analysed to find the main reasons for under-representation of gene pairs. A total of 49 references covered all missed interactions in the DIP database. A summary is provided in Table 6. The predominant problems were due to three main integrity issues: insufficient synonym lists, synonym case variation, and complex gene families with immature or complex naming conventions. These problems mainly caused a reduction in true gene pairs, and did not as much lead to noise. As DIP is based on protein names not necessarily included in the name lists used in the present embodiments, it is expected that especially synonym problems will be elevated in such a comparison. However, as very few interactions are missed due to lack of citation in the title or abstract, an even better representation is expected from optimising the indexing procedure.

TABLE 6

Reasons for under-representation of DIP derived gene pairs

| Reason | Number of articles |
|---|---|
| Missing in abstract | 5 |
| Symbol case mismatch | 22 |
| Missing alternative symbol | 24 |
| Complex protein (gene) family name | 9 |
| Other | 5 |
| Sum | 65 |

It is difficult to assess the expectations precisely from these experiments, as the manually cured databases only contain subsets of the data of the present system not necessarily reflected in titles or abstracts of MEDLINE records. However, the numbers of interactions in DIP and OMIM contained in the present system reflect that it captures significant amounts of the existing biological information on protein-protein interactions and on gene mapping and disease.

Following the analyses of the network, the data analysis methods provided by the invention can be used to combine the background knowledge represented by the gene literature network in analysis of gene expression data from a large-scale gene expression study. The automatic integration of background knowledge provided by the methods of the invention make the methods of data analysis provided, combined with the methods of automatic extraction of co-occurrences, a significant complement to conventional data analysis methods not taking background knowledge into consideration.

Gene expression data can be combined with information from the literature network to compute an expression score for each gene in the analysis. The input format of the data is a list of pairs $(g_i, v_i)$, where $g_i$ is a gene and $v_i$ is a real number representing the level of gene expression, for instance, on an absolute scale, on a relative scale such as a ratio, a log of a ratio, or a difference or a ratio of such aforementioned examples in the case of comparison between two experiments. Following the input of such data to the invention a scoring step is performed, wherein each gene is scored by superimposing gene expression data onto a literature neighbourhood of the gene. The size of the neighbourhood used is parameterised so as to allow the user to change the level of detail as desired. In a typical setting the neighbourhood is computed by a modified breadth first search. The modifications are limitations in the number of nodes (genes) that can be visited on each level. Of the immediate neighbours of the gene, at most $B1$ may be visited and on the second level, or depth, of each neighbour, at most $B2$ of its neighbours may be visited, not counting those that have already been visited, and so on to a maximum depth $D$. In addition, as an overall limitation on the size of the network, at most $N$ nodes may be visited in total and the expansion of the neighbourhood terminates upon fulfilment of the most restrictive criterion. The parameters $N$, $D$, and $B1$, $B2$, . . . may be specified by the user, or the user may omit this step and use predefined default values. Typical values are $N=50$, $D=3$, $B1=15$, and $B2=3$;

Following the extraction of a neighbourhood, a score q1 is computed as $$q_1 = f\left(\frac{1}{n}\sum_{i=1}^{n} h(x_i)\right),$$

where f is the absolute value function or the identity function, h is the absolute value function or the identity function, n is the number of genes in the neighbourhood, and xi is the expression value of gene i.

An alternative score q2 is computed as $$q_2 = f\left(\frac{1}{n_p}\sum_{i=1}^{n_p} h_1(h_2(x_{i_1}, x_{i_2}))\right),$$

where f is the absolute value function or the identity function, h1 is the absolute value function or mean function, h2 is the absolute value function or the mean function, np is the number of distinct pairs of genes linked by literature co-occurrences in the neighbourhood, and xi1 is the expression value of the first gene in pair i and xi2 is the expression value of the second gene in pair i. The alternative score q2 can be used to favour gene networks (neighbourhoods) which are tightly connected.

Parameters determining the calculation of scores may be defined by the user.

The microarray data set of Alizadeh et al.—Distinct types of diffuse large B-cell lymphoma identified by gene expression profiling. *Nature* 403, 503–11 (2000)—contains mRNA expression measurements across 96 normal and malignant lymphocyte samples, and represents one of the the most informative and rich data set on human material so far published. The authors presented an analysis based on unsupervised hierarchical clustering analysis of the data. They proposed the term "signature gene cluster" as an operational definition to indicate genes that are co-ordinately expressed and thus cluster together. Of the six identified signatures thought to characterise distinct cell types or biological processes they identified, the germinal centre B-cell (GC-B) signature highlights a main finding using the hierarchical clustering technique in that germinal centre (GC) B-cells represent a specific stage of B-cell differentiation, distinct from activation of blood B-cells. Using the GC-B signature and the signature for activated B-cells, diffuse large B-cell lymphomas could be divided into two subgroups having features from either germinal centre B-cells or activated blood B-cells; these subgroups were also distinguished by clinical outcome.

To explore the correlation between unsupervised clustering and the supervised approach in accordance with the present invention in a large biologically relevant data set, in accordance with the invention there has been extracted the data for tonsil GC B-cells and activated B-cells isolated from healthy individuals. The publicly available data subset contains measurements on 4,026 clone spots that can be mapped, through the IMAGE clone-ID's, to 1,302 named genes in the present system. For the two cell-types, we calculated the mean log-ratio for each gene across the samples in each group and submitted the genes group difference to the expression analysis tool. The cell-type mean-value represented an extra layer of abstraction from the original data, performed to highlight group specific biological differences between the two cell types. The 50 genes corresponding to the 50 most up- or down-regulated literature sub-networks included seven (28%) of the 25 named genes in the GC-B signature (BCL6, BMP7, CD24, CD38, E2F5, MME, and MYBL1). This is a seven-fold increase compared to a random experiment (assuming randomly sampling 50 genes without replacement from all 1,302). Moreover, 39 of the 50 genes identified by the present system were cluster designations (CDs) (data not shown), which are surface cell markers generally used to define lymphocyte differentiation stages. The products of these genes are known to be significant regulators of lymphocyte functions. Using the Alizadeh web analysis tool (http://llmpp.nih.gov/lymphoma/index.shtml), we were able to link 21 of the 50 top-ranked genes to one of the B-cell signatures found by hierarchical clustering. The distribution of the 21 genes among the 3 B-cell signatures in Table 6 illustrates the correlation between the supervised approach in accordance with the present invention and the unsupervised clustering approach.

TABLE 6

B-cell signature cluster associations for the 50 highest ranked genes according to expression analysis

| Signature | Number of genes | | |
|---|---|---|---|
| | All | Member | Similar |
| Activated peripheral B-cell | 37 (87) | 2 | 3 |
| Resting peripheral B-cell | 21 (81) | 2 | 9 |
| Germinal Center B-cell | 25 (112) | 3 | 2 |
| Sum | 83 (270) | 7 | 14 |

For each of the 50 genes in the present example there have been investigated associations to the three B-cell signatures using similarity of the clustering patterns of the 20 genes having most similar expression patterns (using Pearson correlation as given by the analysis tool of Alizadeh et. al.) The All column shows the number of genes in the respective signatures, with the number of clones in parenthesis. The Member and Similar columns show the number of genes among the 50 highest ranked genes that could be classified as a member of a B-cell signature, or whose majority of most closely related genes (clones) were from the given B-cell signature. A large number of the genes could in this way be associated with one of the B-cell signatures (42%), as opposed to 6% by pure chance, reflecting the B-cell nature of the samples being submitted.

To estimate the extent of complementarity of the two approaches in normal biological processes reflected in the extracted microarray data, in accordance with the invention an attempt has been made to characterise the biological basis for the GC-B signature using the tools in accordance with the present invention. This starts with the 25 named genes found with hierarchical clustering by Alizadeh et. al. and extracted a network in accordance with the present invention based on the named GC-B signature genes. Five of the 25 signature genes did not have neighbours in the present system, and therefore would not show in a network. The remainder and the most important literature neighbours (among the 1,302 genes with expression data) could all be connected as shown in FIG. 6, thus displaying an underlying biological relationship between these genes graphically.

An automated annotation of concepts and concept co-occurrences providing additional context useful in interpretation of external data as well as a quick survey of existing knowledge is obtained by also indexing gene ontology terms and linking these terms and also MeSH terms, that are manually indexed, with indexed occurrences of genes. Co-occurrences of target concepts, i.e., genes, and ancillary concepts, i.e., gene ontology or MeSH terms, thus links genes with related keyword.

The signature gene list is then linked to disease MeSH terms to search for diseases associated with the signature genes. The ten top-ranked terms are listed in Table 7.

TABLE 7

Disease MeSH terms associated with the genes in the GC-B signature

| Disease MESH terms | Relative weight |
| --- | --- |
| Fragile-X-Syndrome-genetics | 1 |
| Angelman-Syndrome-genetics | 0.667 |
| Mental-Retardation-genetics | 0.5 |
| Fragile-X-Syndrome-diagnosis | 0.25 |
| Fragile-X-Syndrome-epidemiology | 0.167 |
| Fragile-X-Syndrome-complications | 0.167 |
| Lymphoma-enzymology | 0.118 |
| Leukemia-diagnosis | 0.118 |
| Leukemia-enzymology | 0.118 |
| Tuberculosis | 0.118 |

The disease MeSH terms were found by computing association strengths for MeSH terms in the disease subset (category C in MeSH). For each gene the strength of a term was computed relative to the term with the highest number of article associations. For a single term, the strengths from each gene were combined by multiplication to give the association strength between the term and the 25 signature genes.

Fragile X and Angelman syndromes ranked ahead of lymphoma, because FMR2 and HERC2 are loci associated with these syndromes. FMR2 is down regulated by repeat expansion and methylation. The gene also shows similarity in its protein product with MLLT2, a gene that is involved in translocations found in acute lymphoblastic leukemia cells. Moreover, it is noted that the MLL gene was also listed as a close neighbour of the signature gene MME (CD10). MLL is not a signature gene, i.e., it was not found by the clustering analysis, but is distinctly up regulated in tonsil germinal centre B cells, and has been found trans-located to a number of genes, including FMR2. Transcription was the most significant ontology term obtained by the genes in the GC-B signature, reflecting that a large number of the signature genes are transcriptional regulators.

Use of the system in accordance with the present invention rapidly focused the extracted biological attention for the GC-B signature genes towards central GC B-cell processes. The DNTT gene is up regulated as a signature gene. This gene is involved in normal V(D)J immunoglobulin recombination in B-cells. A number of the genes identified tend to be translocated in lymphomas (FMR2, MLL, BCL6, and BCL7A), as disclosed by the MeSH terms and their neighbouring positions in expression networks. All of these genes are displayed in FIG. 6 as up-regulated in GC-B cells, most likely a reflection of hypermutability being a process of immunoglobulin variation. Indeed, current models of immunoglobulin variation suggest that both the recombination and hypermutability processes take place in the germinal centre. Recently, it was confirmed that the process of hypermutability is a major discriminant between the germinal centre versus activated B cell-like lymphomas, as an ongoing somatic mutation process was shown in the lymphomas of the GC-B type.

Further insights into the process involving the genes can be obtained by using the GO term mapping facility of the invention. Table 8 incorporates one GO category (cell process), and in the ranked list according to relevancy, several relevant features are readily observable. First, in the process we are examining, tumours relating to B-cell germinal-centre lymphomas, the main feature of the germinal centre is B-cell DNA recombination. This term is identified as one of the top ranked processes associated with the presented gene list. Also notable are transcription and cell proliferation, as several of the genes regulating the recombination behaviour are activated by these processes. A third feature of this list is apoptosis, programmed cell death. All of these latter processes are very generic and would tend to show up in any gene list. Thus, the user would tend to identify recombination as the most relevant candidate for further exploration in biological experiments.

TABLE 8

Process GO terms associated with the genes in the GC-B signature

| GO ID | Description of term | Disjunctive score |
| --- | --- | --- |
| GO:0006350 | transcription | 22.531776 |
| GO:0008283 | cell proliferation | 10.054210 |
| GO:0007165 | signal transduction | 9.632806 |
| GO:0007049 | cell cycle | 8.536452 |
| GO:0006915 | apoptosis | 8.056630 |
| GO:0007155 | cell adhesion | 7.048279 |
| GO:0008220 | necrosis | 5.972743 |
| GO:0008152 | metabolism | 4.896300 |
| GO:0008219 | cell death | 3.814840 |
| GO:0007610 | behaviour | 3.794433 |
| GO:0007145 | recombination | 3.578703 |
| GO:0006810 | transport | 3.262874 |

Applications of the invention include concept level document retrieval systems. As described, information retrieval for concept-level queries is complicated when concepts have several alternative names or several concepts share names. Applications of the invention also include information extraction of relationships between concepts expressed or implied in written text. Other applications of the invention include data analysis utilizing background information represented in the form of relationships between concepts.

By focusing on a specified list of target concepts, information retrieval can be improved by using concept-level indexing, wherein synonymy and polysemy are resolved with the indexing procedure, and domain-specific knowledge not applicable to general-purpose information retrieval methods.

By contrast to the invention, the above-referenced paper of Stapley, B. J. & Benoit does not include the automated construction of a domain specific dictionary, the resolution of term ambiguity, nor any of the analyses downstream of the network construction, in particular the Gene Expression Analysis tool and the mapping to ancillary concepts, disclosed herein.

While the present invention has been described in terms of the above embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A method of constructing a network of conceptual entities and their relationships, each conceptual entity having associated therewith (i) at least one identifying name comprising at least one word, and (ii) at least one identifying abbreviation; in which data processing means is used to scan at least one database comprising a plurality of text documents, each document referring to a plurality conceptual entities by means of at least one identifying name or at least one identifying abbreviation; wherein conceptual entities in the documents are identified by scanning for abbreviations of conceptual entities in the document; co-occurrences of different conceptual entities in the same document are noted; information is recorded representing the co-occurrences and the number of documents in which they appear; and a network is provided representing relationships between conceptual entities; wherein conceptual entities are also identified in documents by means of scanning for conceptual entity names, and at least some abbreviations are only accepted as representing a reference to a conceptual entity in a given document if the scan reveals that at least one word from one name of the conceptual entity also appears in a suitable part of the given document.

2. A method as claimed in claim 1, wherein a filtering procedure is carried out when mapping occurrences of abbreviations into valid occurrences of conceptual entities, in which if an abbreviation is longer than L1 characters and is found in less than K documents, then all occurrences of the abbreviation in documents are treated as valid occurrences of the associated conceptual entity in those documents.

3. A method as claimed in claim 2, wherein L1 is 4 and K is 10.

4. A method as claimed in claim 2, wherein if an abbreviation is longer than L2 characters an occurrence of the abbreviation will be treated as a valid occurrence of a conceptual entity in a particular document if there are also at least W words from an associated conceptual entity name in that particular document.

5. A method as claimed in claim 4, wherein if the abbreviation is no more than L2 characters long, then there must be more than W words from at least one of the conceptual entity names if an occurrence of the abbreviation in a document is to be treated as a valid occurrence of a conceptual entity in a document.

6. A method as claimed in claim 5, wherein L2 is 2 and W is 1.

7. A method as claimed in claim 6, wherein L2 is less than or equal to L1.

8. A method as claimed in claim 1, further comprising the steps of compiling a computerized hierarchical dictionary in the form of a database of conceptual entities each identified by a unique identifier, wherein there is stored in the database, for each conceptual entity, a list of associated names of which one associated name is selected as a primary name and the remaining associated names are considered as synonyms:
inputting one or more lists of conceptual entity names together with a list of unique identifiers or a rule to determine unique identifiers from the list of names together with a rule to determine the list of primary names to correspond with the unique identifiers; and
identifying conceptual entity name families.

9. A text data processing method for indexing conceptual entities in text, comprising the steps of:
creating a hierarchical dictionary for names of conceptual entities by the steps of compiling the dictionary in the form of a database of conceptual entities identified by a unique identifier, wherein each conceptual entity has a list of associated names of which one of the associated names is selected as a primary name and the remaining names are considered as synonyms; inputting one or more lists of names together with a list of unique identifiers or a rule to determine unique identifiers from the list of names together with a rule to determine the list of primary names to correspond with the unique identifiers; and identifying conceptual entity name families; the method further comprising the steps of:
inputting the dictionary into a data processor;
inputting units of text into the data processor;
detecting names of conceptual entities in said units of text;
organizing occurrences of names into occurrences of conceptual entities, by means of filtering occurrences of names before accepting these as valid occurrences of the associated conceptual entities, wherein the length of the name and the frequency of occurrence within all, or a subset of, units of text is taken into consideration; and
mapping occurrences of names into occurrences of corresponding conceptual entities to which these names are associated, including resolution of ambiguities of polysemic names.

10. A method as claimed in claim 9, wherein the dictionary is pre-generated.

11. A method as claimed in claim 9, wherein the units of text are scientific abstracts.

12. A method as claimed in claim 9, wherein the units of text are logical sub-units of text documents.

13. A method as claimed in claim 12, wherein the units of text are paragraphs or sentences.

14. A method as claimed in claim 9, wherein the method includes the filtering of names from a list of names which are expected to be ambiguous, comprising the further step of generating a list of ambiguous names shared by several conceptual entities.

15. A method as claimed in claim 14, wherein the list of ambiguous names is pre-generated and input by the user.

16. A method as claimed in claim 9 wherein the analysis of co-occurrences includes the annotation of co-occurrences by co-indexing ancillary conceptual entities, comprising the steps of indexing ancillary conceptual concepts, and linking each pair of co-occurring target conceptual entities with occurrences of ancillary conceptual entities.

17. A method as claimed in claim 9, including the steps of utilizing relationships between conceptual entities extracted from text documents in data analysis of external data associated with the conceptual entities, comprising the further steps of:
scoring networks of conceptual entities defined by the relationships extracted from text documents with the external data;
sorting the scored networks; and
outputting the optimal scored networks with the scores.

18. A method as claimed in claim 9, for utilizing relationships between conceptual entities extracted from text documents in data analysis of external data associated with the conceptual entities, comprising the steps of:
scoring networks of conceptual entities defined by the relationships extracted from text documents with the external data;
sorting the scored networks; and
computing most relevant ancillary conceptual entities for each subset of conceptual entities defined by each of the networks, wherein the most relevant conceptual entities are those that co-occurred most frequently with the target conceptual entities in the said subset of conceptual entities.

19. A method as claimed in claim 9, comprising the steps of: scoring networks and subsets of target conceptual entities defined by the relationships with ancillary conceptual entities as extracted from text documents; and sorting the scored networks and subsets of target conceptual entities.

20. A data processing system for constructing a network of conceptual entities and their relationships, each conceptual entity having associated therewith (i) at least one identifying name comprising at least one word, and (ii) at least one identifying abbreviation; the data processing system being configured to (a) scan at least one database comprising a plurality of text documents, each document referring to a plurality conceptual entities by means of at least one identifying name or at least one identifying abbreviation; (b) identify conceptual entities in the documents by scanning for abbreviations of conceptual entities in the document; (c) note co-occurrences of different conceptual entities in the same document; (d) record information representing the co-occurrences and the number of documents in which they appear; and (e) provide a network representing relationships between conceptual entities; wherein the data processing system is also configured to identify conceptual entities in documents by means of scanning for conceptual entity names, and at least some abbreviations are only accepted as representing a reference to a conceptual entity in a given document if the scan reveals that at least one word from one name of the conceptual entity also appears in a suitable part of the given document.

21. A text data processing system for indexing conceptual entities in text, the data processing system being configured to:

create a hierarchical dictionary for names of conceptual entities by the steps of compiling the dictionary in the form of a database of conceptual entities identified by a unique identifier, wherein each conceptual entity has a list of associated names of which one of the associated names is selected as a primary name and the remaining names are considered as synonyms; receive as input one or more lists of names together with a list of unique identifiers or a rule to determine unique identifiers from the list of names together with a rule to determine the list of primary names to correspond with the unique identifiers; and identify conceptual entity name families; the data processing system being further configured to:

receive as input the dictionary into a data processor;

receive as input units of text into the data processor;

detect names of conceptual entities in said units of text;

organize occurrences of names into occurrences of conceptual entities, by means of filtering occurrences of names before accepting these as valid occurrences of the associated conceptual entities, wherein the length of the name and the frequency of occurrence within all, or a subset of, units of text is taken into consideration; and map occurrences of names into occurrences of corresponding conceptual entities to which these names are associated, including resolution of ambiguities of polysemic names.

* * * * *